(12) United States Patent
Rondeau et al.

(10) Patent No.: US 6,874,590 B2
(45) Date of Patent: Apr. 5, 2005

(54) FENDER STRUCTURE FOR AN ALL TERRAIN VEHICLE

(75) Inventors: Pierre Rondeau, St-Denis-de-Brompton (CA); Martin Portelance, Sherbrooke (CA); Martin Aubé, St-Bruno-de-Montarville (CA)

(73) Assignee: Bombardier Recreational Products Inc., Valcourt (CA)

( * ) Notice: Subject to any disclaimer, the term of this patent is extended or adjusted under 35 U.S.C. 154(b) by 57 days.

(21) Appl. No.: 09/922,237

(22) Filed: Aug. 6, 2001

(65) Prior Publication Data

US 2002/0047257 A1 Apr. 25, 2002

Related U.S. Application Data

(60) Provisional application No. 60/222,934, filed on Aug. 4, 2000.

(51) Int. Cl.[7] .......................... B62D 23/00; B62D 29/00; B62D 25/18; B60J 7/00; B60R 19/03
(52) U.S. Cl. ................. 180/89.1; 296/198; 296/901.01; 280/849; 280/769; 293/120
(58) Field of Search .............................. 280/849, 769, 280/833; 180/89.1, 908, 311, 312, 291, 215, 233, 210; 293/120, 102, 117; 296/198, 37.1, 75, 901, 186, 194, 901.01; 446/269, 431; D21/533; 224/401, 42.11, 539

(56) References Cited

U.S. PATENT DOCUMENTS

| | | | | |
|---|---|---|---|---|
| 3,632,156 A | * | 1/1972 | Schweser | .................. 296/31 P |
| 3,688,856 A | * | 9/1972 | Boehm et al. | .................. 180/5 |
| 3,712,397 A | * | 1/1973 | Smith, III et al. | ........... 180/6.2 |
| 4,535,869 A | * | 8/1985 | Tsutsumikoshi et al. | ..... 180/311 |
| 5,474,483 A | * | 12/1995 | Sun | .............................. 446/71 |
| 5,791,431 A | * | 8/1998 | Asao et al. | .................. 180/311 |
| 6,026,923 A | * | 2/2000 | Uphaus | ...................... 180/312 |
| 6,170,841 B1 | * | 1/2001 | Mizuta | ......................... 280/89 |
| 6,224,134 B1 | * | 5/2001 | Johnson et al. | ................ 296/75 |
| 6,299,244 B1 | * | 10/2001 | Tarahomi | ..................... 296/210 |
| 6,523,634 B1 | * | 2/2003 | Gagnon et al. | ............. 180/291 |

* cited by examiner

Primary Examiner—Christopher P. Ellis
Assistant Examiner—Gerald B. Klebe
(74) Attorney, Agent, or Firm—BRP Legal Services

(57) ABSTRACT

An all terrain vehicle (ATV) includes a plurality of wheels and a fender structure positioned over the wheels having a support portion designed as and defining a load-bearing surface. The fender structure may include a plurality of raised support portions that increase rigidity and load capacity. Additionally, it is not necessary to support either the fender structure or the support portion using the bumper of the ATV. The fender structure may be formed with plastic material, such as polyethylene, polypropylene or fiberglass-charged polyethylene, and may be manufactured using a blow-molding technique or an injection molding technique. The ATV may also include mud guards and a floor board that extends between the mud guards. The mud guards and the floor board may be formed as an integral or one piece unit with the fender structure. The mud guards can be injection molded or blow-molded while the fender structure can be blow-molded.

19 Claims, 11 Drawing Sheets

FENDER STRUCTURE FOR AN ALL TERRAIN VEHICLE

This application claims priority to U.S. Provisional patent application Ser. No. 60/222,934, titled "FENDER STRUCTURE FOR AN ALL-TERRAIN VEHICLE", filed Aug. 22, 2000. This application is also related to co-pending application Ser. No. 09/338,749 filed on Jun. 23, 1999, and co-pending application Ser. No. 09/057,652 filed on Apr. 9, 1998, both applications being incorporated herein in their entirety by reference thereto.

FIELD OF THE INVENTION

This invention relates to an all terrain vehicle (ATV), and more particularly to an ATV having a fender structure.

BACKGROUND AND SUMMARY OF THE INVENTION

Heretofore, ATVs have typically used front and/or rear rack structures to support a load. In addition, some ATVs may have a storage compartment positioned in front of the steering wheel or behind the seat, between the left and right fenders.

For example, FIG. 1 is a perspective view showing a related art ATV 100, as shown and described in the copending applications cross-referenced above. The ATV 100 includes a pair of front wheels 102 and a pair of rear wheels 103. The front and rear wheels 102, 103 are suspended by a vehicle frame (unshown) using suspension members 106. The ATV 100 includes a fender structure including a front fender 104 that covers the front wheels 102 and a rear fender 112 that covers the rear wheels 103. A rear storage rack 108 is fixedly mounted above the rear fenders 112 and a front storage rack 110 is fixedly mounted above the front fenders 104. A load can be mounted to the storage racks 108, 110, because these racks provide a support structure.

As shown in FIG. 2, the front storage rack 110 is connected to a front bumper 114 of the ATV 100 using one or more joint members 116. The front bumper 114 is connected to the main frame. At the opposite end of the joint members 116, the front storage rack 110 includes additional joint members (not shown) that extend through apertures in the front fenders 104 and connect to the main frame.

Referring back to FIG. 1, the rear storage rack 108 can be similarly connected to a rear bumper 113 and may extend through the rear fenders 112 to connect to the main frame. Traditionally, the fender structures, such as the front and rear fenders 104, 112, have been made of plastic, while the storage racks, e.g., racks, 108, 110, have been made of metal as shown in FIGS. 1 and 2.

The ATV 100 may also include a cover 115 that is pivotally or hingedly mounted on a portion 117 of the fender structure of the ATV 100 that connects the front fenders 104 to one another. As seen in FIG. 2, the cover 115 pivots with respect to both the fenders 104 and the front storage rack 110. The cover 115 is sized and configured so as to provide an openable closure for a front storage compartment 118 positioned between the front fenders 104.

This related art front storage rack and fender assembly suffers from several main drawbacks. For example, the fender structure, e.g., fender 104 or 112, is made of a different material than the storage racks 108, 110, and extra parts, assembly steps and labor are required to assemble the fenders and the racks on the main frame with respect to one another. Further, the central portion 122 of the storage rack 110 is connected to the front bumper 114 for support. Additionally, the weight of the metal rack itself along with mounting hardware, such as the joint members 116, increases the ATV's overall weight. Furthermore, metal racks are prone to corrosion (e.g., rust), which is exacerbated by the typical operating environment of an ATV (e.g., water, sand, dirt, etc.).

Accordingly, a need has developed for an improved fender structure that overcomes these disadvantages, among others.

It is, therefore, one aspect of the present invention to avoid the main drawbacks of the related art, e.g., by providing an ATV with a fender structure that is easy to assemble and manufacture.

Another aspect of the present invention is to provide a support portion that allows for the force of a load placed on the support portion to be transferred to the frame, regardless of the positioning of the load on the support portion.

It is another aspect of the invention to provide a fender structure with a support portion formed from a single piece of plastic material with a high load capacity. The single piece can be formed using a blow-molding process or an injection molding process. Because of its great strength and rigidity, the fender structure can be mounted directly on the main frame without attachment to the bumper.

Another aspect of the invention is to provide a storage compartment between the fenders. The storage compartment may be integrated with the fenders and a cover may be provided to cover and/or seal the storage compartment. Because of the strength and rigidity of the fender structure and support portion, a load may be reliably supported on the cover, the support portion, or both.

According to one preferred embodiment of the present invention, a fender structure for a vehicle with a plurality of wheels includes a right fender portion positionable over a right wheel and a left fender portion associated with the right fender portion and positionable over a left wheel. At least one of the right fender portion and the left fender portion includes a support portion designed as a load-bearing surface that is defined at least in part by a top surface of at least one of the left and right fender portions. The present invention is also directed to an ATV having such a fender structure.

In embodiments, the fender structure may further include a storage compartment formed in the support portion with an opening through which items may be placed into the storage compartment, and a cover positionable over the opening. The fender structure may further include raised support portions, in at least one of a lateral, longitudinal, and diagonal direction, integrally formed in at least one of the support portion and the storage compartment. The right fender portion, the left fender portion and the support portion may be integrally formed with one another as a single unit, and the single unit may be formed by one of blow-molding and injection molding. The single unit may be made of at least one of polyethylene, polypropylene, and fiberglass-reinforced polyethylene.

The vehicle or the fender structure may further include a mud guard positionable adjacent at least one of the left and right wheels and a floor board extending away from the at least one mud guard. The at least one mud guard and the floor board may be formed in one blow-molded piece with the right fender portion, the left fender portion and the support portion. Alternatively, the at least one mud guard and the floor board may be formed of injection molded plastic, and the right fender portion, the left fender portion and the support portion may be formed of blow-molded plastic.

According to another preferred embodiment of the present invention, an all terrain vehicle including a plurality of wheels includes a fender structure positioned over the wheels. The fender structure includes a plurality of raised support portions, wherein the raised support portions and the fender structure are formed of plastic material.

In embodiments, the plastic material may be selected from a group including polyethylene, polypropylene and fiberglass-charged polyethylene. Also, the vehicle may include a main frame to which the wheels are suspended and a bumper supported by the main frame, wherein the raised support portions are supported by the main frame and not the bumper. The raised support portions and the fender structure may be formed as a one-piece unit using, for example, a molding technique, e.g., blow-molding or injection molding.

According to yet another aspect of the invention, an all terrain vehicle includes a main frame that suspends a plurality of wheels, a fender structure supported by the main frame. The fender structure has a plurality of built-in raised support portions.

In embodiments, the built-in raised support portions and the fender structure may be, for example made of plastic, e.g., polyethylene, polypropylene and fiberglass-charged polyethylene. Also, the fender structure and the built-in support portions may be formed in a one-piece structure. The vehicle may further comprise a storage compartment positioned within the fender structure, and a cover dimensioned to cover the storage compartment.

These and other aspects of preferred embodiments of the invention will be described in or apparent from the following detailed description of preferred embodiments.

BRIEF DESCRIPTION OF THE DRAWINGS

Preferred embodiments of the invention will be described in conjunction with the following drawings, wherein.

DETAILED DESCRIPTION OF THE PREFERRED EMBODIMENTS

Figure 3:
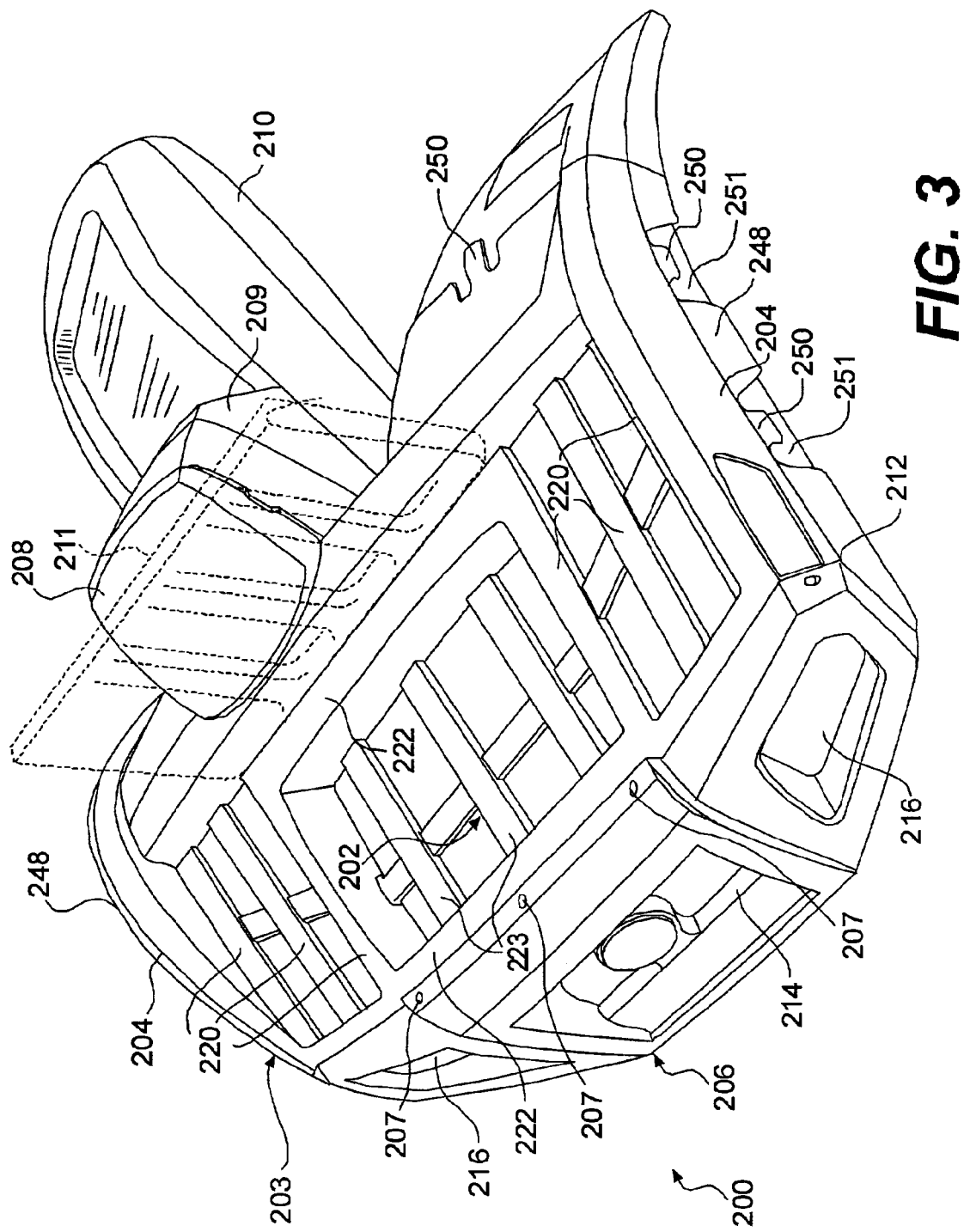
FIG. 3 is a front perspective view illustrating a forward end portion of an ATV according to one preferred embodiment of the present invention.

FIG. 3 illustrates a fender structure 203 of a front end portion 200 of an ATV according to one preferred embodiment of the present invention. The front end portion 200 may include a front storage compartment 202 that can be formed integrally (e.g., in one piece) with the fender structure 203, which is provided above the wheels (not shown) of the ATV. For example, the storage compartment 202 can be positioned between a pair of front fenders 204, which form a portion of the fender structure 203. The front storage compartment 202 is intended to store cargo, for example, water containers, boxes, etc. The front storage compartment 202 may be provided with a cover 211 that covers the front storage compartment 202. The cover 211 may be pivotably connected to the fender structure 203. For example, the fender structure 203 may include hinges, e.g., living hinges, that are formed just in front of the handlebars. Of course, the fender structure 203 is not limited to the front end portion 200 of the ATV, but may also encompass the rear end portion of the ATV, as described below in relation to FIGS. 5 and 6.

The front end portion 200 also includes a connection structure located at a forward end 212 of the fender structure 203. The connection structure, for example, includes extensions having suitable apertures, slots, through-holes, etc. 207, for aligning with and/or detachably receiving a front end structure 206 of the front end portion 200 of the ATV 200. In a preferred embodiment, the front end structure 206 is attached to the fender structure 203 using, e.g., bolts. The front end structure 206 defines, e.g., grillwork 214 and openings 216 for receiving headlights (not shown). Rather than being attached to the fender structure 203 using bolts, the front end structure 206 can be formed integrally or in one piece with the fender structure 203.

The front end portion 200 may also include an access panel 208 for accessing a filter (not shown) for filtering intake air through an intake air inlet. The intake air is provided to an intake air box positioned near the engine, as described in the copending applications cross-referenced above. In the event that the intake air inlet is not provided in front of the handlebars, the access panel 208 can simply serve to protect the steering column (not shown) of the ATV. The access panel 208 may be detachably connected to a box-like structure 209 that encompasses the air filter. Also, a gas tank 210 is provided on the fender structure 203 and extends towards the rear of the ATV. The gas tank 210 and the box-like structure 209 can be integrally formed or formed in one piece with the fender structure 203.

It is contemplated that the fender structure 203 may be formed by conventional molding techniques utilizing polymer materials, e.g., blow molding, injection molding, etc., so as to form the pair of fenders 204 and the storage compartment 202 integrally, i.e., as a singular or one-piece body. Other materials and/or techniques are, of course, possible. Of course it is not necessary to provide the ATV with the storage compartment 202.

The fender structure 203 also includes a support portion that is designed as a load bearing surface. The support portion is defined by at least a top portion of one or more of the left and right fenders 204. In FIG. 3, the support portion includes a plurality of integrally formed raised support portions 220, 222 that are built-in to the fender structure 203. The support portions 220 may be in the form of lateral portions on each side of the front storage compartment 202, and the support portions 222 may be in the form of cross-over portions that are transverse to the lateral portions 220. The upper surface of the cover 211 may include one or more raised support portions that are similar to the lateral support portions 220. In this embodiment, the lateral portions 220 and the cross-over portions 222 are designed as and define the support surface. As shown in FIG. 3, the bottom surface of the storage compartment 202 also includes raised portions 223, i.e., ribs, defining a raised support plane and providing flexural rigidity. In addition to providing a load bearing surface, the lateral portions 220, 223 and the cross-over portions 222 also have the effect of increasing the rigidity of the fender structure 203, by increasing its resistance to torsion.

Figure 1:
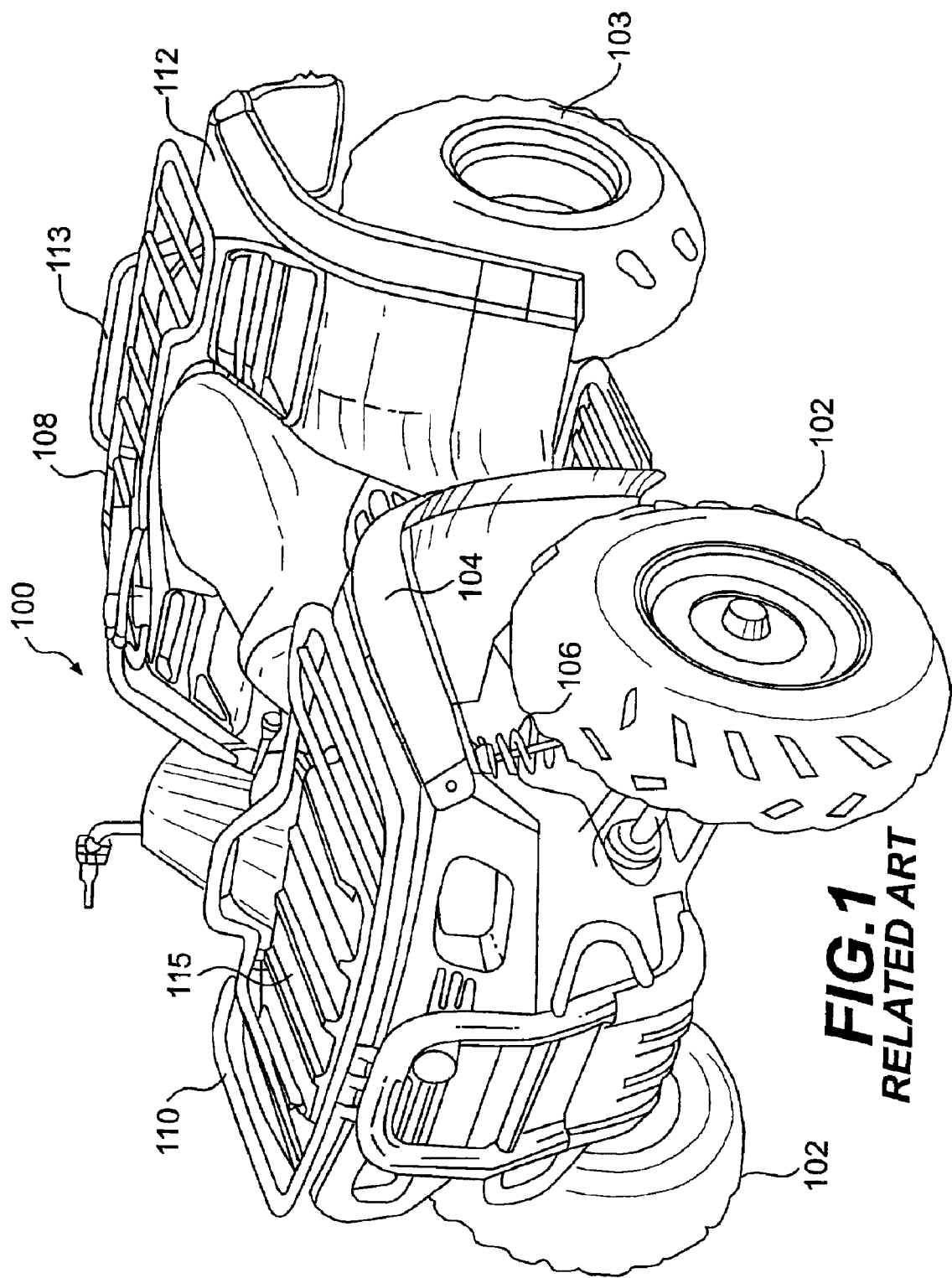
FIG. 1 is a front perspective view of a related art ATV.
Figure 2:
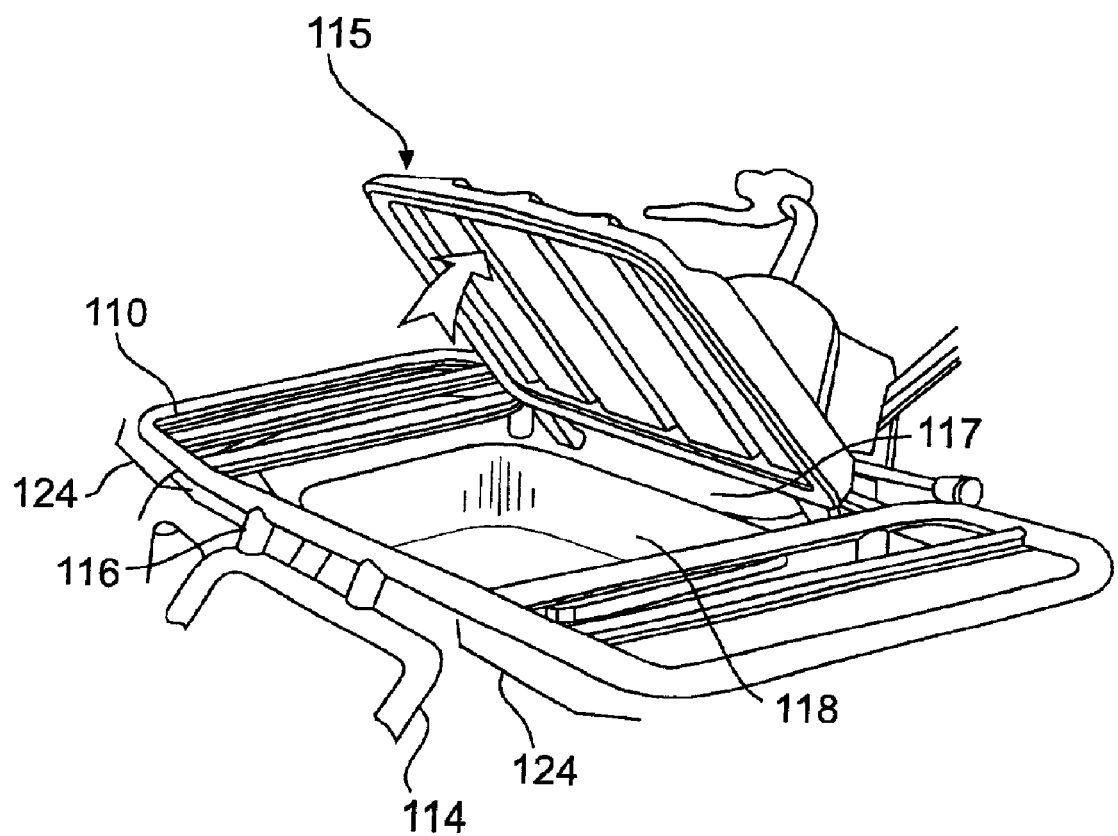
FIG. 2 illustrates a front storage rack and cover of the related art ATV shown in FIG. 1.

Preferably, the support portions 220, 222 are formed in one piece with the fender structure 203, such as with the molding technique stated above. Integrating the fender structure 203 with the support portions 220, 222 advantageously reduces assembly and labor costs. Furthermore, it was unexpectedly discovered that the one-piece construction has a large load capacity and a high rigidity. Thus, the support portions 220, 222 can be supported without relying on the bumper of the ATV for structural support, which is an advantage over the construction of the ATV 100 shown in related art FIGS. 1 and 2. Also, because the support portions are made of plastic, it is not necessary to provide a corrosion resistant coating, as in the case of metal storage racks, which are subject to corrosion.

It is believed that the improved rigidity of the fender structure 203 is due at least in part to the process and materials used to manufacture the fender structure 203. For example, the fender structure 203, including the raised support portions 220, 222, is preferably formed of plastic material having high rigidity. The plastic material can be, for example, selected from the group including polyethylene, polypropylene and fiberglass-reinforced polyethylene.

As shown in FIG. 3, outer end portions 248 of the fender structure 203 (i.e., outer end portions of the fenders 204) may include hook structures 250 to allow ropes, bungy cords, etc., to be fastened thereto to thereby secure loads being supported on the raised support portions 220, 222. Each hook structure 250 depends from an upper edge of a generally outwardly facing recess 251 within the outer end portion 248. Preferably, the hook structures 250 are contained within the recesses 251 so as to not protrude laterally outwardly therefrom. With this arrangement, the hook structures 250 are prevented from snagging on objects during movement of the ATV. However, the hook structure 250 shown on the top surface of the left fender 204 is not shown as being flush, but instead can be designed to protrude slightly above the fender surface. Further, the hook structure 250 is shown as extending over a junction between the fender 204 and a mudguard (not numbered) such that the mudguard is positioned below the hook structure 250.

Additionally, it is contemplated that the hook structures 250 may include forwardly and rearwardly extending prongs, so as to act as a cleat to facilitate the attachment of ropes and such. Furthermore, the hook structures 250 may include apertures, to further facilitate fastening the ropes, etc. It is noted that, while FIG. 3 shows three (3) hook structures 250 included with the fenders 204, it is, of course, possible that any number of hook structures 250 may be incorporated with the fenders 204. Also, the hook structures 250 may be of any size. It is contemplated that each hook structure 250 may be integrally formed in one piece with the fender structure 203.

Figure 4:
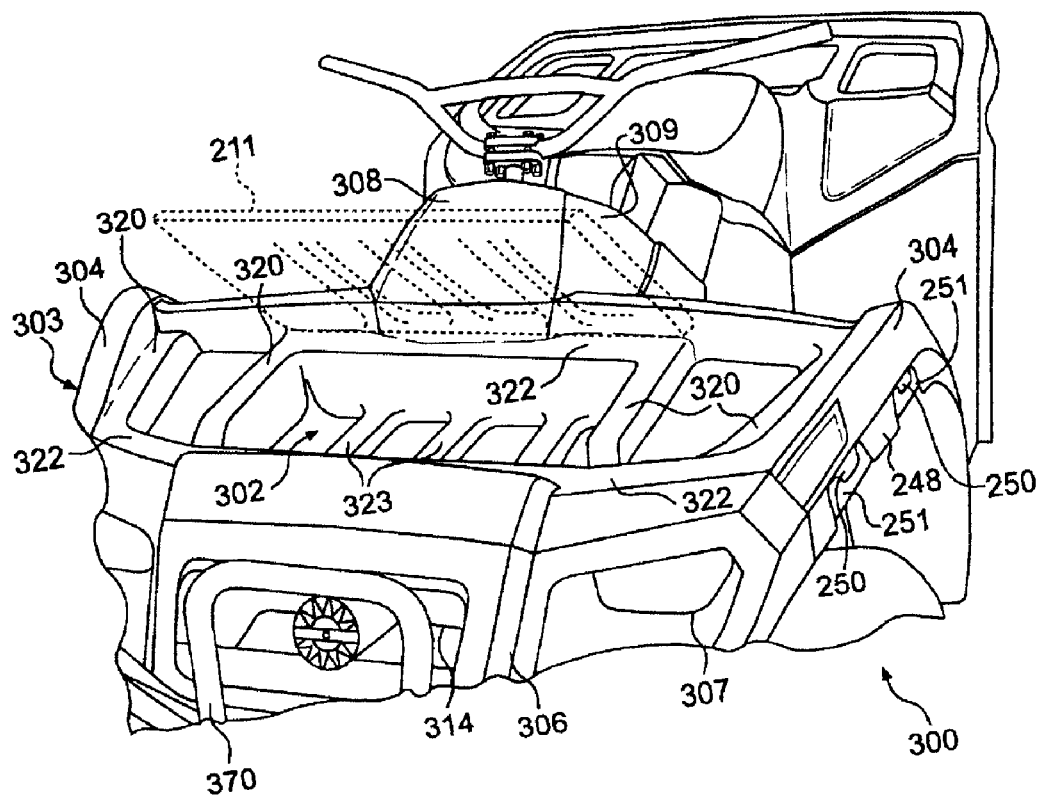
FIG. 4 is a front perspective view illustrating a portion of an ATV according to another preferred embodiment of the present invention.
Figure 5:
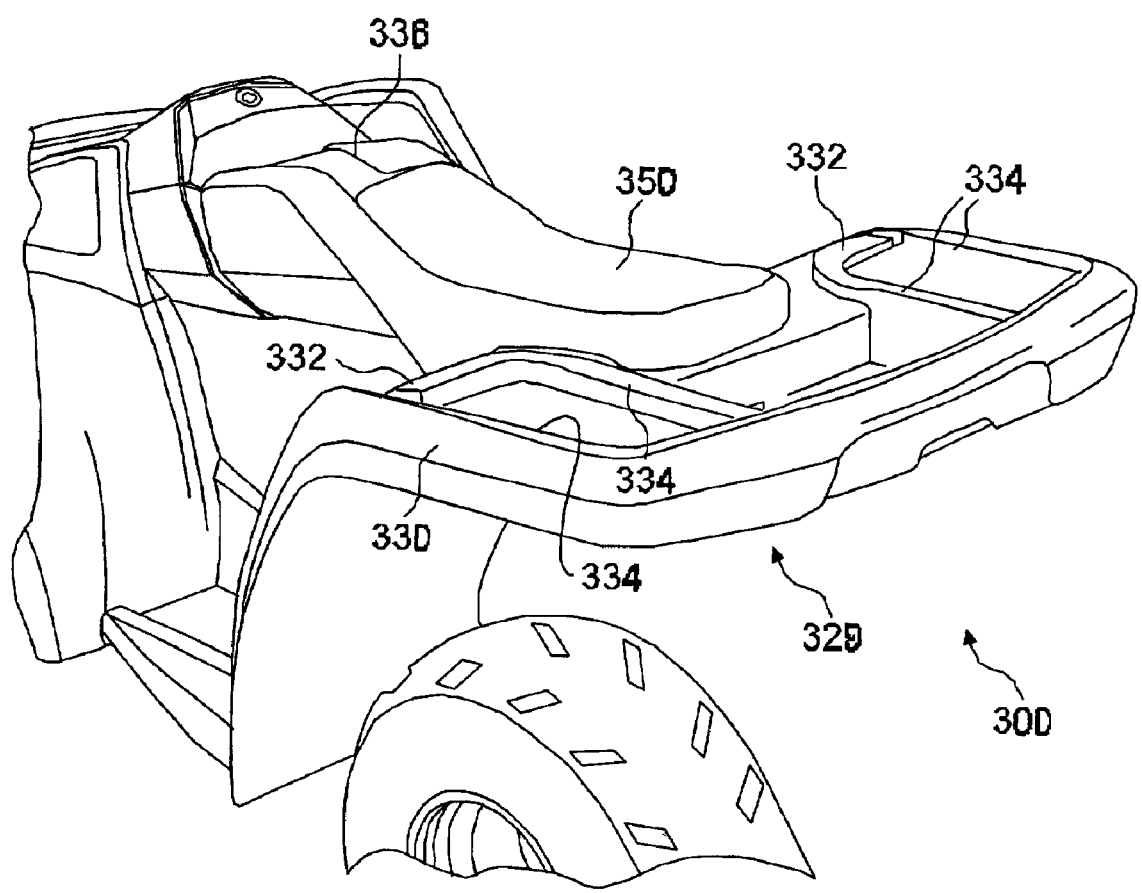
FIG. 5 is a rear perspective view of a portion of the ATV shown in FIG. 4.

FIGS. 4 and 5 illustrate a portion of an ATV 300 according to another preferred embodiment of the invention. The ATV 300 includes a fender structure 303 having a support portion that is designed as a load bearing surface. The support portion is designed by at least a top portion of at least one of the left and right fenders 304. A front storage compartment 302 may be formed as an integral part of the fender structure 303. The support portion may include a portion of the storage compartment 302, e.g., a top surface. Other like elements that are similar to, or the same as, those shown in FIG. 3 have been labeled with like reference numbers. The storage compartment 302 is bordered by a plurality of raised support portions, including lateral portions 320 and cross-over portions 322, which are designed as and define the support surface. The support portions are shown as being unsupported by the front bumper 370 of the ATV 300.

While the fender structures 203, 303 and raised support portions 220, 222, 320, 322 have been described in relation to the front end portion of an ATV 300, most if not all of the features relating to the front end portion could also be applied to the rear end portion of the ATV 300. As shown in FIG. 5, which is a rear perspective view of a portion of the ATV 300, the fender structure 303 may additionally include a rear fender structure 329. The rear fender structure 329 includes rear fenders 330, which have integrally molded, raised support portions 332, 334 that define a load bearing or support surface at the rear end portion of the ATV 300.

Figure 6:
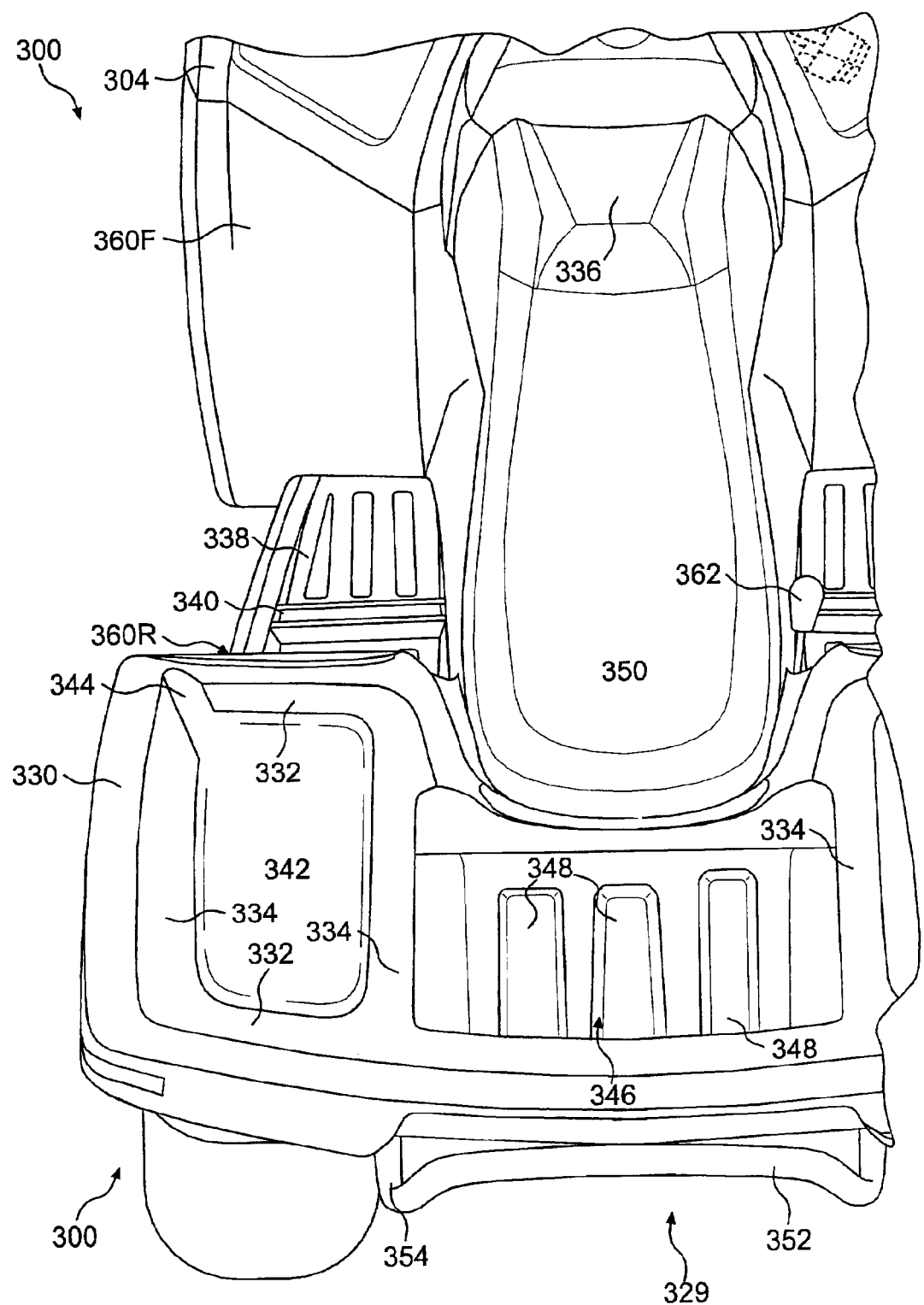
FIG. 6 is a partial top view of the ATV shown in FIG. 4.

As shown in FIG. 6, the raised support portions 332, 334 on each side of the ATV 300 form a support surface that is disposed above a side compartment 342 defined by the support portions 332, 334. A drain 344 is provided for each side compartment 342 to allow for accumulated water or liquid to be drained along the rear fender 330 and/or a rear mud guard 360R of the ATV 300. Also, the support surface defined by the support portions 332, 334 on the left side is substantially coplanar with the support surface defined by the set of support portions 332, 334 on the right side of the ATV 300. In addition, the rear fenders 330 define a further support surface that is above and parallel to the common support surface defined by the left and right sets of support portions 332, 334.

FIG. 6 also shows a rear storage compartment 346 positioned between the rear fenders 330 and behind a seat 350 of the ATV 300. The rear storage compartment 346 includes a plurality of raised portions 348 that help provide stiffening and strengthening of the fender structure. The raised portions 348 also provide a raised load carrying surface at upper portions thereof. As with the front storage compartment 302, the rear storage compartment 346 may be integrally formed and preferably is formed as a single unit with the rear fenders 330, including the raised support portions 332, 334. The rear storage compartment 346 may also include a cover (not shown) or hook structures, such as those shown in FIGS. 3 and 4. Moreover, the entire fender structure 303, which includes the front fenders 304 and the rear fenders 330, may be formed as a single unit.

Figure 7:
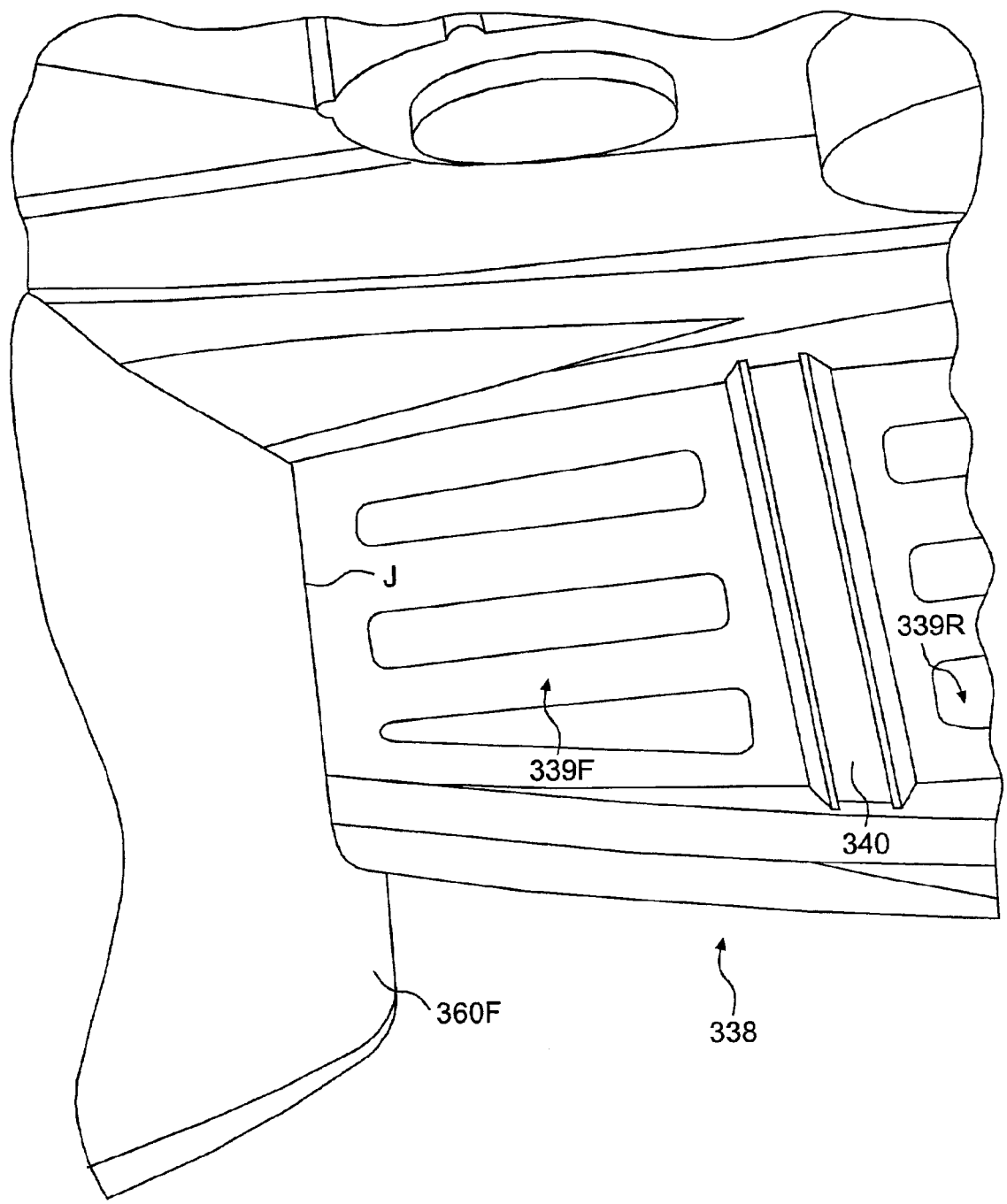
FIG. 7 is a detail view of the floor boards shown in FIG. 6.

FIG. 6 also shows floor boards 338 that extend between the front and rear fenders 304, 330. Specifically, the floor boards 338 extend between a rear mud guard 360R and a front mud guard 360F. As shown in FIG. 7, each of the floor boards 338 includes front and rear floor board portions 339F, 339R that are separated with a divider 340. The divider 340 helps the rider maintain his or her heel in a consistent position during riding. The rear floor board portion 339R has relatively a wide portion toward the rear mud guard 360R (see FIG. 6) that tapers toward the front mud guard 360F, and the front floor board portion 339F has a relatively narrow portion where it meets with the front mud guard 339F at a junction J.

The high load capacity is at least in part due to the process and materials used to manufacture the fender structure. For example, manufacturing the fender structure in an integral or one piece unit with the storage rack allows the forces of a load to be more evenly distributed throughout the entire fender structure. Also, because the support portions are made of plastic, it is not necessary to provide a corrosion resistant coating, as in the case of metal storage racks, which are subject to corrosion.

The fender structure 303 may be supported by a frame 10 as shown and described in U.S. application Ser. No. 09/824, 878 filed on Apr. 4, 2001, incorporated herein by reference. Of course, other frames not shown in that application can be used to support the fender structure described herein.

Figure 8A:
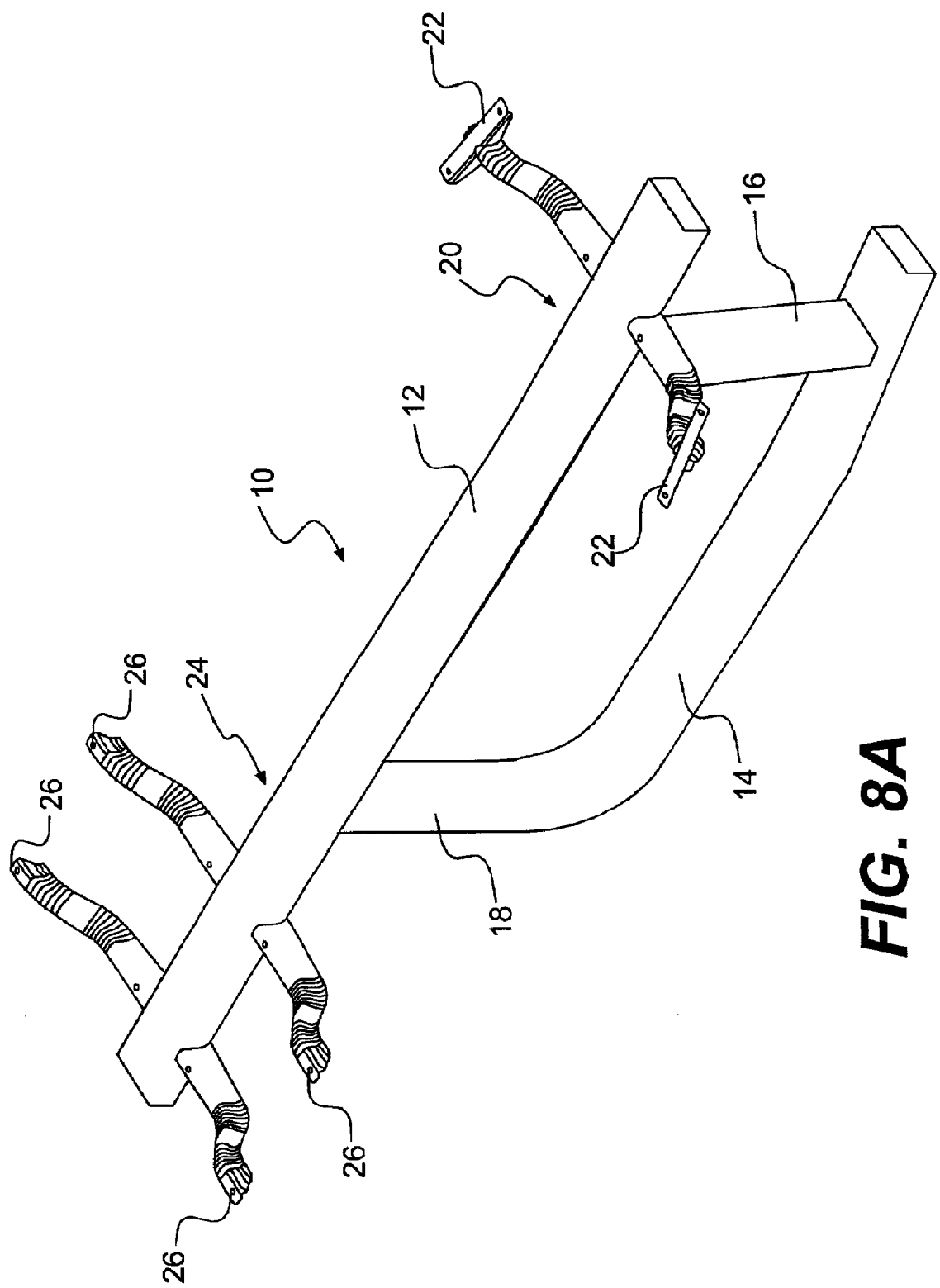
FIG. 8A is a perspective view of a frame according to one embodiment of the present invention.

As described in detail in that application and shown in FIG. 8A, a frame 10 includes an upper member 12 and a lower member 14. The upper and lower members 12, 14 are interconnected by a forward cross member 16 and a rearward cross member 18. The members 12-18 are preferably formed as tubular members, such as rectangular tubular members made of steel, aluminum, or other suitable materials. It is contemplated that one end portion (forward or rearward end portion) of either of the upper or lower members 12, 14 may be bent toward and connected to the other to form one of the forward or rearward cross members 16, 18. For example, as shown in FIG. 8A, a rearward portion of the lower member 14 is bent generally upwardly and connected, e.g., welded to a rearward portion of the upper member 12.

A forward end portion, indicated at 20 may include a pair of front fender hangers 22 extending outwardly from the upper member 12. The front fender structure 203 or 303 is mounted to the fender hangers 22 with, for example, bolts, screws, rivets, adhesive, etc. Similarly, a rearward end portion 24 may have a plurality of rear fender hangers 26, which allow the rear fenders 330 to be mounted thereto with e.g., bolts, screws, rivets, adhesive, etc. The fender hangers 22, 26 transfer load of the respective fenders and fender structure and any cargo supported thereon to the frame 10.

Figure 8B:
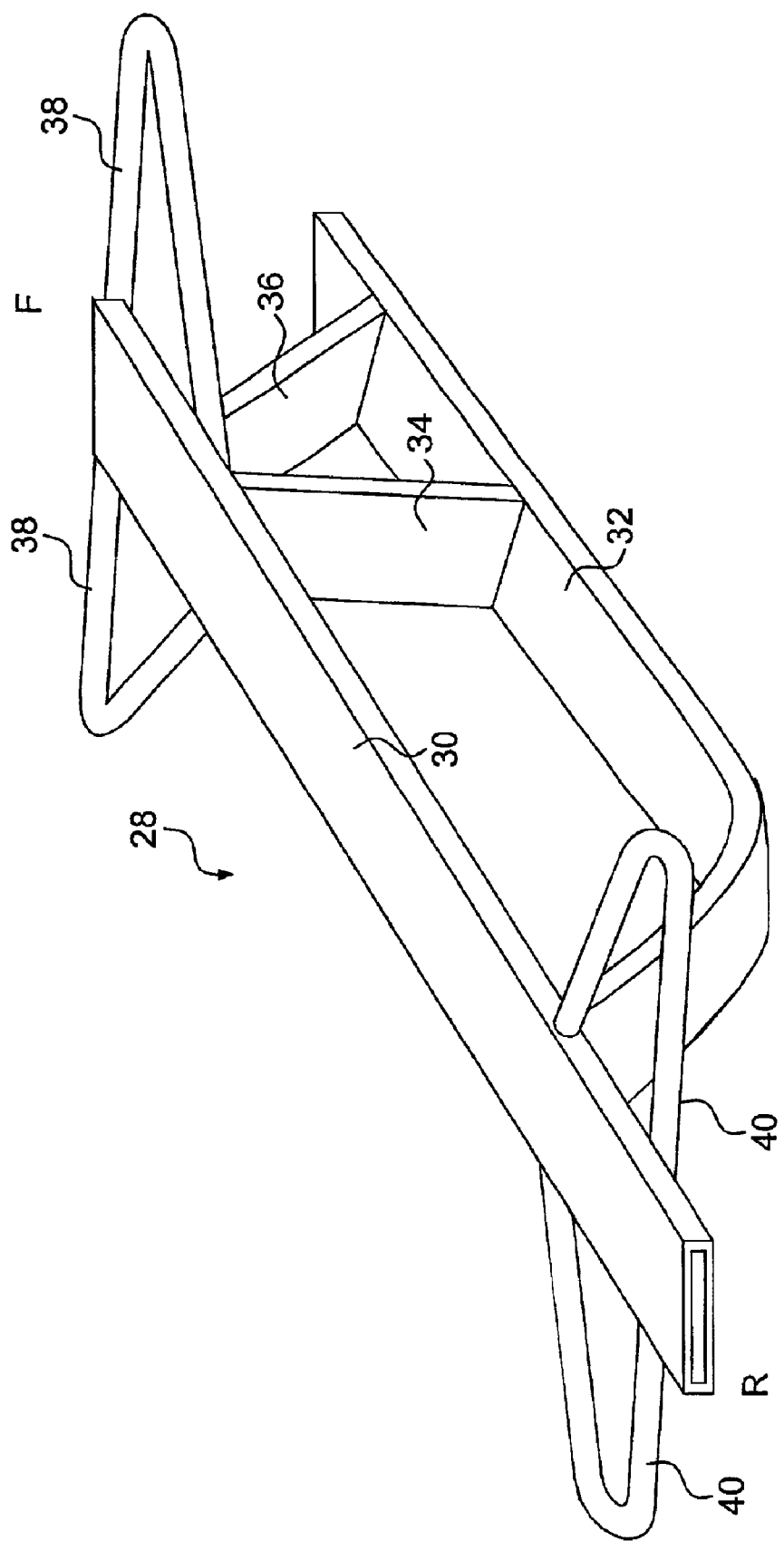
FIG. 8B is a perspective view of a frame according to another preferred embodiment of the present invention.

Another embodiment of a frame for the ATV is shown in FIG. 8B. As shown, the frame 28 includes an upper member 30 and a lower member 32. The lower member 32 sweeps upward for connection, e.g., welding, to the upper member 30 at the rear R of the frame 28. The upper member 30 and the lower member 32 are connected at the front F of the frame 28 by one or more cross members 34, 36.

Figure 10:
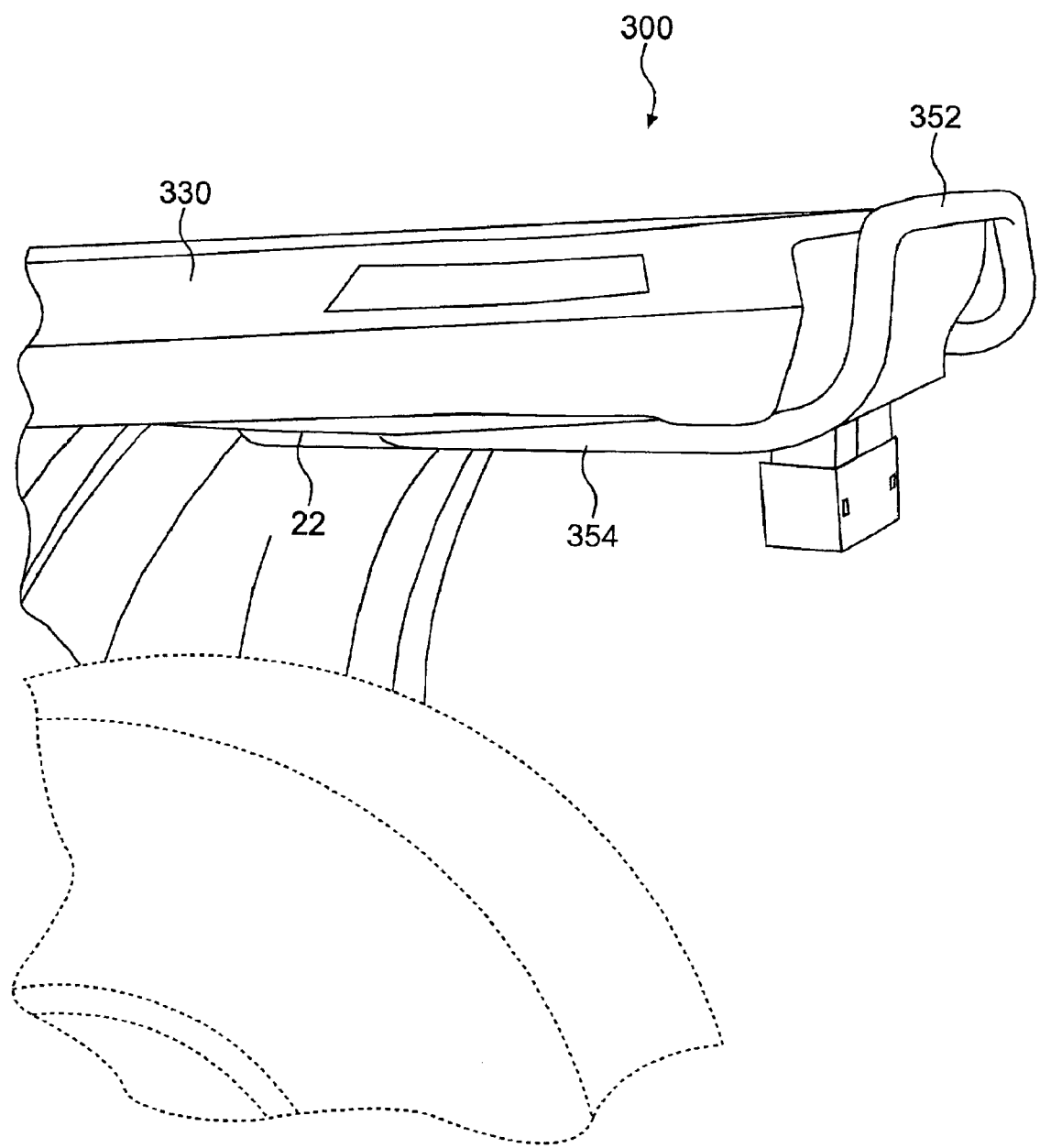
FIG. 10 is a partial side perspective view of the ATV shown in FIG. 6.

At the front F of the upper member 30, a pair of generally U-shaped support bars 38 are provided. A pair of generally U-shaped support bars 40 are provided at the rear R of the upper member 30. The support bars 38, 40 may also have different shapes, and are not limited to U-shaped members. Portions of the support bars 38, 40 extend along the width, e.g., about ⅔ of the width, and beneath the front and rear storage compartments 302, 346, respectively. As shown in FIG. 10, a rear handlebar 352 includes laterally extending portions 354 that connect to the portions of the rear support bars 40.

Figure 9:
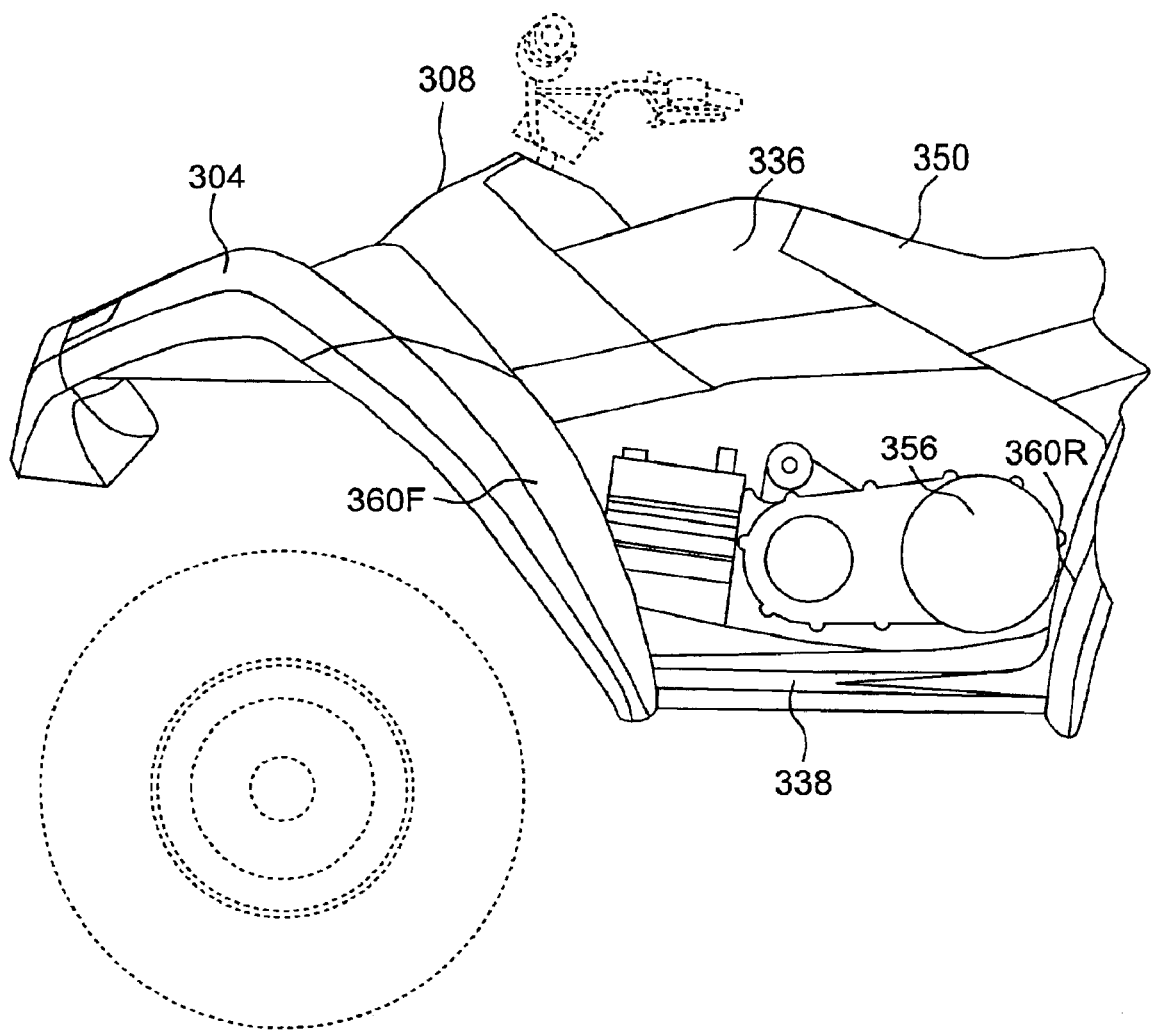
FIG. 9 is a partial side view of the ATV shown in FIG. 4.

FIGS. 6 and 9 show a gas tank 336 that is positioned between the seat 350 and the air filter access panel 308 described previously. As shown, the gas tank 336 is positioned above an engine 356. Furthermore, the gas tank 336 is shaped such that it can support a load, thereby increasing the useful area on the ATV 300 where luggage can be placed. For example, a "bungy" net could be used with the gas tank 336 to hold a load in place. The gas tank 336 may be provided with one or more hook structures, as shown in FIGS. 3 and 4. The engine 356 has a horsepower rating of about 11–16 hp, and is mounted between the upper member 12, 30 and the lower member 14, 32 (FIGS. 8A and 8B, respectively). The horsepower rating of the engine 356 is another factor to be considered in determining the load capacity of the front and rear storage racks. As mentioned above, the frame is also a factor that is considered in determining the load capacity.

Preferably, the fender structure 303, including the support portions, is manufactured using a blow-molding process. As is well known, blow-molding involves inserting a tube of polyethylene into a mold having inside walls shaped to define the fender structure 303, closing the inserted ends of the tubes and blowing air into the tube until it contacts the inside walls of the mold and takes the form of the fender structure 303. One advantage of this process compared with other manufacturing processes, such as injection molding, is the increased rigidity of the part produced. Increased rigidity enables the front and rear racks to support heavier loads. However, other manufacturing techniques could be used, e.g., twin sheet forming, injection molding with or without gas assist, and rotomolding.

By contrast, the floor boards 338 and mud guards 360R, 360F are manufactured preferably using injection molding. With the injection molding process, although the mold may be expensive, the floor boards 338 and mud guards 360R, 360F can be manufactured and sold less expensively as compared to other processes. Also, as shown in FIG. 7, the joint J between, for example, the front mud guard 360F and the front floor board portion 339F is subject to repeated loading and unloading stresses. Thus, in one preferred embodiment, the mud guards and the floor boards can be made using an injection molding process so that the desired degree of flexibility is provided to the joint J. The combined mud guards 360F, 360R and floor boards 338 can then be integrally attached to the fender structure 303. Nonetheless, a blow-molding process could be used to produce the mud guards 360R, 360F and the floor boards 338, along with the fender structure 303, as a one piece unit.

FIG. 6 shows a gear shifter 362 that is located adjacent the seat 350 and is generally behind the rider of the ATV 300. The positioning of the gear shifter 362 in this location provides for improved ergonomic design. In particular, because the gear shifter 362 is located on the right side of the ATV 300, it is necessary for the rider to remove his or her hand from the handlebar where the throttle is located in order to change gears.

While preferred embodiments of the invention have been shown and described, it is evident that variations and modifications are possible that are within the spirit and scope of the preferred embodiments described herein.

What is claimed:

1. A fender structure for a vehicle with a plurality of wheels, comprising:

a right fender portion positionable over a right wheel;

a left fender portion associated with the right fender portion and positionable over a left wheel, wherein at least one of the right fender portion and the left fender portion includes a support portion designed as a load-bearing surface that is defined at least in part by a top surface of at least one of the left and right fender portions;

raised support portions, in at least one of a lateral, longitudinal, and diagonal direction, formed in one piece with the support portion, the raised support portions defining at least one raised support plane;

a mud guard positionable adjacent at least one of the left and right wheels; and a floor board extending away from the at least one mud guard, wherein at least one of the mud guard and the floor board is made of injection molded plastic.

2. The fender structure of claim 1, wherein the mud guard and the floor board are formed as a one piece unit.

3. The fender structure of claim 1, wherein the at least one mud guard and the floor board are formed in one piece with the right fender portion, the left fender portion and the support portion.

4. The fender structure of claim 1, wherein the at least one mud guard and the floor board are formed of injection molded plastic, and the right fender portion, the left fender portion and the support portion are formed of blow-molded plastic.

5. A vehicle with a plurality of wheels, comprising:
 a right fender portion positionable over a right wheel;
 a left fender portion associated with the right fender portion and positionable over a left wheel, wherein at least one of the right fender portion and the left fender portion includes a support portion designed as a load-bearing surface that is defined at least in part by a top surface of at least one of the left and right fender portions;
 raised support portions, in at least one of a lateral, longitudinal, and diagonal direction, formed in one piece with the support portion, the raised support portions defining at least one raised support plane;
 a mud guard positionable adjacent at least one of the left and right wheels; and
 a floor board extending away from the mud guard,
 wherein at least one of the mud guard and the floor board is made of injection molded plastic.

6. The vehicles of claim 5, wherein the mud guard and the floor board are formed as a one-piece unit.

7. The vehicle of claim 5, wherein the at least one mud guard and the floor board are formed in one piece with the right fender portion, the left fender portion and the support portion.

8. The vehicle of claim 5, wherein the at least one mud guard and the floor board are formed of injection molded plastic, and the right fender portion, the left fender portion and the support portion are formed of one of blow-molded and injection molded plastic.

9. An all terrain vehicle including a plurality of wheels, the vehicle comprising:
 a fender structure positioned over the wheels, the fender structure including a plurality of raised support portions defining at least one raised support plane, wherein the raised support portions and the fender structure are formed of a plastic material;
 a main frame from which the wheels are suspended; and
 a bumper supported by the main frame,
 wherein the raised support portions are supported by the main frame and are not supported by the bumper; and
 further comprising a storage compartment formed in one piece with the fender structure and the raised support portions, and
 a cover that is sized to cover the storage compartment.

10. The all terrain vehicle of claim 9, wherein the fender structure includes a central support surface defined by the cover and a lateral support surface on each side of the central support surface.

11. The all terrain vehicle of claim 9, wherein the fender structure includes lateral portions an each side of the storage compartment.

12. The all terrain vehicle of claim 11, wherein the fender structure includes at least one cross-over portion extending transverse to the lateral portions, the lateral portions and the at least one cross-over portion defining a support plane.

13. An all terrain vehicle comprising:
 a main frame that suspends a plurality of wheels;
 a fender structure supported by the main frame, the fender structure having a plurality of built-in raised support portions defining at least one raised support plane;
 a storage compartment positioned within the fender structure;
 a cover sized to cover the storage compartment,
 wherein the fender structure includes a central support surface defined by the cover and a lateral support surface on each side of the central support surface; and
 a mud guard and a floor board formed in one piece with the fender structure.

14. The all terrain vehicle of claim 13, wherein the fender structure and the plurality of built-in raised support portions are made of plastic selected from the group comprising polyethylene, polypropylene and fiberglass-charged polyethylene.

15. The all terrain vehicle of claim 13, wherein the fender structure, the mud guard and the floor board are formed as a single unit.

16. The all terrain vehicle of claim 13, wherein the fender structure is a front end portion of the all terrain vehicle.

17. The all terrain vehicle of claim 13, wherein the fender structure is a rear end portion of the all terrain vehicle.

18. The all terrain vehicle of claim 13, wherein the mud guard and the floor board are formed as at first one piece unit and the fender structure and the built-in raised support portions are formed as a second one piece unit.

19. The all terrain vehicle of claim 18, wherein the first one piece unit is made from en injection molded plastic and the second one piece unit is made of a blow-molded plastic.

* * * * *